United States Patent [19]
Morris

[11] Patent Number: 5,390,184
[45] Date of Patent: Feb. 14, 1995

[54] FLEXIBLE SCHEDULING MECHANISM FOR ATM SWITCHES

[75] Inventor: Todd D. Morris, Kanata, Canada

[73] Assignee: Northern Telecom Limited, Montreal, Canada

[21] Appl. No.: 128,416

[22] Filed: Sep. 30, 1993

[51] Int. Cl.⁶ .............................................. H04J 3/24
[52] U.S. Cl. ............................. 370/94.2; 370/60; 370/94.1
[58] Field of Search ................ 370/94.2, 60, 60.1, 370/59, 16, 94.1, 110.1

[56] References Cited

U.S. PATENT DOCUMENTS

| | | | |
|---|---|---|---|
| 4,926,416 | 5/1990 | Welk | 370/60.1 |
| 5,119,370 | 6/1992 | Terry | 370/60.1 |
| 5,144,619 | 9/1993 | Munter | 370/60.1 |
| 5,241,536 | 8/1993 | Grimble et al. | 370/60.1 |
| 5,283,782 | 2/1994 | Takase et al. | 370/16 |
| 5,287,348 | 2/1994 | Schmidt et al. | 370/94.2 |

FOREIGN PATENT DOCUMENTS 1148000  6/1989  Japan .
2224547  9/1990  Japan .

*Primary Examiner*—Douglas W. Olms
*Assistant Examiner*—Shick Hom
*Attorney, Agent, or Firm*—Yoshiharu Toyooka

[57] ABSTRACT

A novel flexible scheduling mechanism which can be used in an ATM switch is disclosed. The new scheduling mechanism allows an ATM switch to handle ATM as well as STM traffic. Video, voice, and data traffic have different service requirements. It is desirable that an ATM switch also be able to handle STM traffic. The invention uses an STM scheduler and an ATM scheduler. A slot reservation technique is used in an STM scheduler in which certain slots can be reserved for STM traffic only. The STM scheduler has priority over the ATM scheduler so that STM traffic is handled with minimum delay to assure synchronous treatment of traffic with small cell delay variation.

9 Claims, 4 Drawing Sheets

FLEXIBLE SCHEDULING MECHANISM FOR ATM SWITCHES

FIELD OF THE INVENTION

The present invention relates generally to high speed telecommunication switches and switching techniques. More specifically, the invention is directed to a novel ATM switching technique which handles both STM and ATM data.

BACKGROUND OF THE INVENTION

ATM technology has been designed with the intention of providing service for a wide variety of applications such as voice, video, and data. Each of these applications has different service requirements in terms of cell loss, delay, and cell delay variation (CDV). For example, voice traffic can withstand a small amount of cell loss, but it is rather intolerant to delay and CDV. Due to the asynchronous statistical nature of ATM, voice traffic must be smoothed at the receiver end in order to eliminate any accumulated CDV incurred in the network. The requirements for video traffic are somewhat dependent upon coding and compression schemes. These coding schemes can produce either constant bit-rate (CBR) or variable bit-rate (VBR) traffic. Video traffic can typically tolerate a small amount of cell loss, however, it is sensitive to delay and CDV (although generally less sensitive than voice). Data services must not lose any information. Cell loss should be very small in order to reduce retransmissions. Data can withstand a considerable amount of delay and CDV.

STM service is ideal for voice and CBR video traffic since CDV and cell loss due to congestion are eliminated. Of course, STM service wastes bandwidth when a particular connection sends no traffic, and VBR services (data or VBR video) cannot be efficiently serviced by STM techniques. It is therefore desirable to design a telecommunication switch which can handle both STM and ATM data.

There have been some proposals dealing with this objective. For example, U.S. Pat. No. 5,119,370 (Terry), issued Jun. 2, 1992, and U.S. Pat. No. 5,144,619 (Munter), issued Sep. 1, 1993, describe a joint STM and ATM network. These previously proposed STM/ATM networks are formed by separate STM and ATM switching equipment. Thus, each switching node is composed of an STM switch and an ATM switch. U.S. Pat. No. 4,926,416 (Welk), issued May 15, 1990, also teaches a similar arrangement in which STM and ATM switches are used for handling mixed traffic. Japanese Opened Application No. 2-224547, published Sep. 6, 1990, and Application No.1-148000, published Jun. 9, 1989, describe ATM/STM hybrid switching systems.

The invention described herein eliminates the STM switch by providing a scheduling mechanism in the ATM switch which provides both ATM and STM service. The present invention therefore relates to the scheduling of ATM cells sent on a transmission medium, and is particularly concerned with effectively providing a suitable quality-of-service for a wide range of traffic applications. Specifically, it is directed to a scheduling mechanism which supports both ATM statistical multiplexing and STM deterministic service on an individual connection basis within an ATM switch.

OBJECTS OF THE INVENTION

It is therefore an object of the present invention to provide an apparatus for and method of handling different types of traffic in an ATM switch.

It is a further object of the present invention to provide an apparatus for and method of handling ATM and STM traffic in an ATM switch.

It is yet another object of the present invention to provide an apparatus for and method of reserving slots in an ATM switch for certain types of traffic to be treated differently.

SUMMARY OF THE INVENTION

Briefly stated, the present invention in one aspect is directed to a telecommunication switch for switching digital data in cells between ports, each cell being a predetermined number of bytes long and containing at least a VCI in its header. The switch comprises a common memory connected to ports for storing each cell received therefrom and a slot reservation controller having a slot reservation table and a linear slot counter to index VCIs of selected cells to selected slot locations of the table. The switch further includes a scheduler to index VCIs of remaining cells and a header reader for reading the header of each cell received from the ports to direct the header to either the slot reservation controller or the scheduler. The switch also has a selection circuit connected to both the slot reservation controller and the scheduler for sending to the common memory an indication of the VCI of a cell to be read out of the common memory.

According to another aspect, the present invention is directed to a method of switching the digital data in cells between ports, each cell being a predetermined number of bytes long and containing at least a VCI in its header. The method includes steps of storing each cell received from the ports in a common memory connected thereto, indexing VCIs of selected cells to selected slot locations of a table contained in a slot reservation controller, and indexing VCIs of remaining cells to a scheduler. The method further includes steps of reading the header of each cell received from the ports to direct the header to either the slot reservation controller or the scheduler, and selecting from the slot reservation controller or the scheduler an indication of the VCI of a cell to be read out of the common memory. There are included in the method, steps of sending the indication to the common memory as a read address and outputting each cell out of the common memory to a selected port.

BRIEF DESCRIPTION OF THE DRAWINGS

For a more complete understanding of the present invention and for further objects and advantages thereof, reference may now be made to the following description, taken in conjunction with the accompanying drawings, in which.

DETAILED DESCRIPTION OF THE EMBODIMENTS OF THE INVENTION

Figure 1:
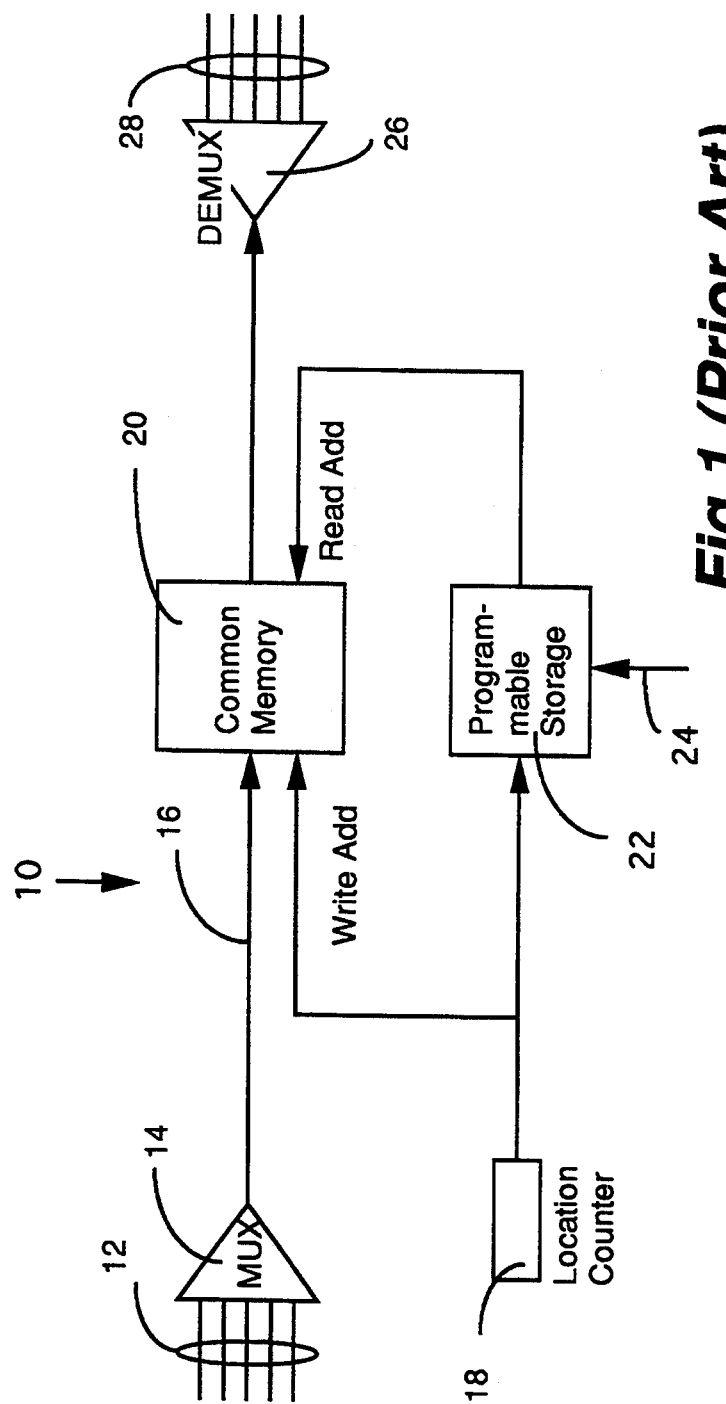
FIG. 1 is a block diagram of a known common memory switch designed to handle STM signals.

FIG. 1 represents a known common memory switch for handling STM signals. A switch 10 receives a fixed length serially propagating STM signal on input channels 12. Multiplexing means 14 accumulates a data word (e.g. one byte long) from each channel and then outputs parallel words from consecutive channels onto a bus 16, outputting one parallel word in each time slot. The multiplexer then cyclically repeats this process. A counter 18 increments its count on each pulse from the system clock, and hence increments at the start of a time slot. Consequently, since the count starts at "1" and the counter overflows when it has counted the last channel, the count output by the counter is always representative of the originating channel of the word on the bus 16. The current count on the counter 18 inputs the write address of the common memory 20 so that the word on bus 16 is written to the address indicated by the count on the counter. Thus, words are stored in a memory 20 at addresses indicative of the switch input channel of the word.

The addresses of programmable storage means 22 represent each switch output channel number of the switch 10 and the data contents are programmed by a connection processor through line 24 with the number of an input channel at each such address. Thus the storage means 22 is a look-up table indicating the input channel that is to be connected to each output channel. The counter addresses the storage means so that the data stored in the storage means at the address represented by the current count inputs the read address of the common memory 20. Since the common memory stores words at addresses indicative of their input channel numbers, the common memory 20, in response to the read address from the storage means, outputs a word from the input channel which is to be connected to the output channel represented by the current count. Furthermore, demultiplexer 26, which ports a word output from the common memory 20 to consecutive output channels 28 (after converting the word back to a serial format) is synchronized with the counter by reason of the system clock and appropriate initialization. Hence, the input channel words are effectively routed to output channels indicated by the storage means.

Figure 2:
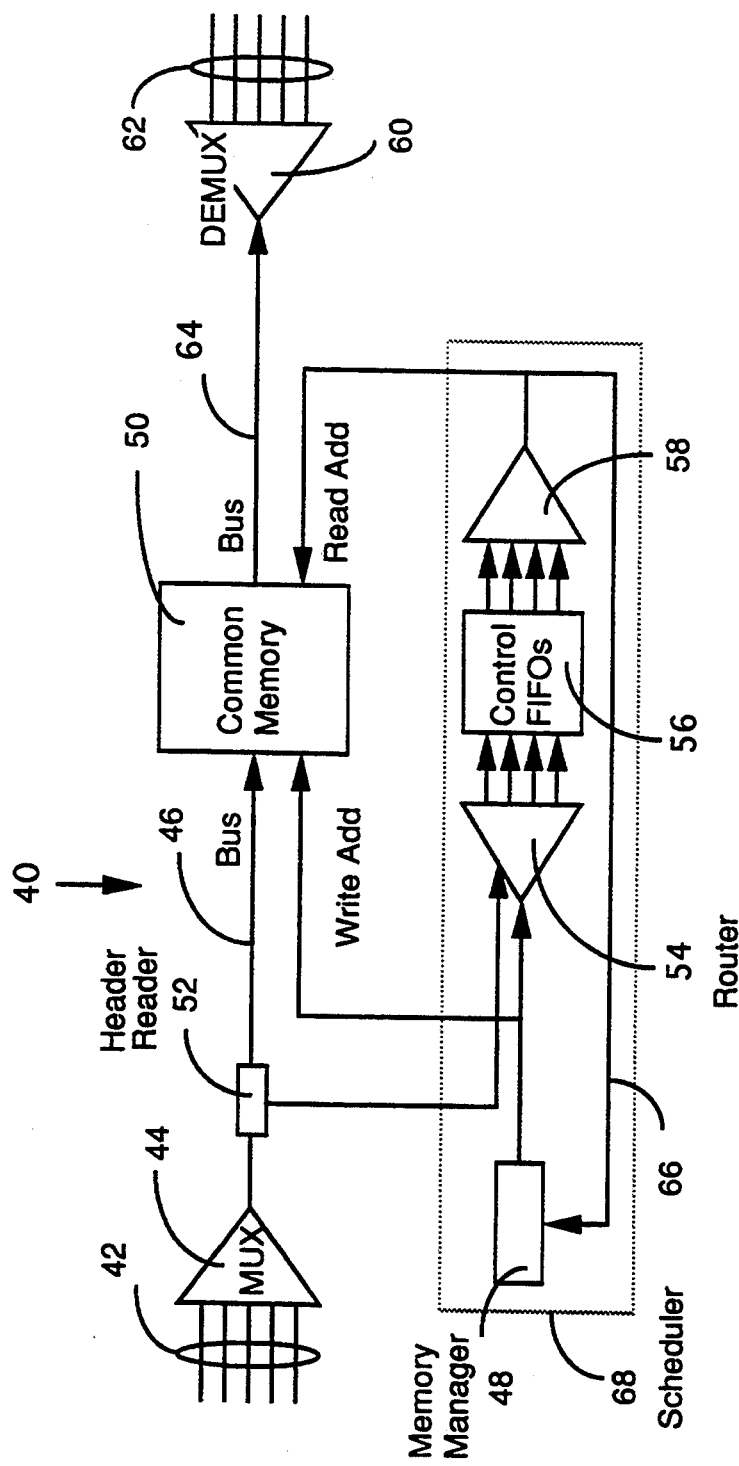
FIG. 2 is a block diagram of a known common memory switch designed to handle ATM signals.

FIG. 2 illustrates a known switch for routing ATM signals. A switch 40 receives serially propagating ATM cells on input channels 42. Multiplexing means 44 accumulates a data cell (or idle cell if there is no cell to send) from each channel and then outputs parallel cells from consecutive channels onto a bus 46 in response to clock pulses from the system clock, one cell being output during each time slot. A memory manager 48 produces the address of the next available memory space in response to the system clock and the current count on the memory manager 48 inputs the write address of a memory 50 so that the cell on bus 46 is written to the address indicated by the count on the memory manager. The header of each cell, which indicates the intended destination by means of VCI/VPI (virtual channel identifier/virtual path identifier) for the particular cell currently being stored in memory 50 (at an address represented by the current count), is extracted at a header reader 52 and is sent to a router 54. The router uses this destination information to write enable the queue of control FIFOs 56 which is assigned to the intended switch output channel so that such queue reads the current count into its tail. Accordingly, the queue assigned to a particular output channel holds data representing the addresses of memory 50 of cells intended for that particular output channel. By virtue of the system clock and appropriate initialization, a multiplexer 58 is synchronized with a demultiplexer 60 connected to output channels 62 so that multiplexer 58 reads a data item from the head of the Nth queue when the demultiplexer has connected the Nth output channel to bus 64. Consequently, when a data item is read from a queue by multiplexer 58, the data item inputs the read address of memory 50 so that the memory outputs a cell to bus 64 which is intended for the output channel currently connected to the bus by the demultiplexer. The read address number is returned to the memory manager 48 to indicate that the space has become free to write in.

In ATM networks, the connection admission control (CAC) function is responsible for accepting or blocking a connection at connection set-up time based on the connection's quality of service (QOS) requirements and the current availability of resources. This CAC function is complicated by the multitude of different service requirements coupled with the statistical nature of ATM. The result is a conservative CAC function which under-utilizes the network. In an effort to increase network efficiency and provide better QOS guarantees, many ATM switches provide multiple priority service. This priority service usually consists of two or more priorities and is preemptive in nature. In other words, as long as there is high priority traffic, this high priority traffic will be serviced before any low priority traffic.

In FIG. 2, an ATM switch contains a scheduler 68 which consists essentially of control FIFOs, a router and a multiplexer. The purpose of the scheduler is to determine which is the next ATM cell to be sent to the physical layer (e.g. demultiplexer) for transmission. For example, with the priority mechanism discussed above, the next cell to be sent is the cell at the head of the highest priority FIFO queue which contains at least one cell for the respective output.

Figure 3:
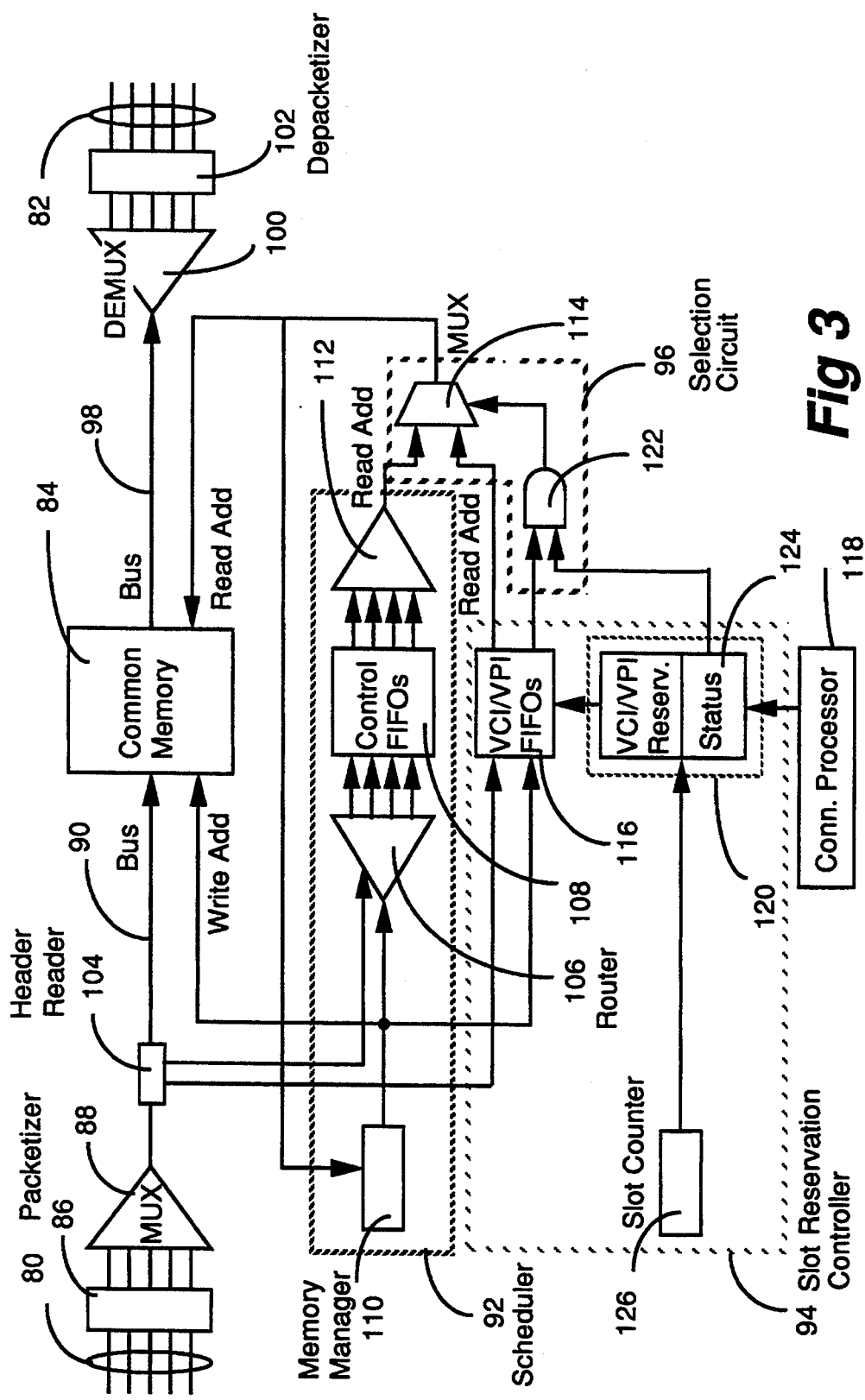
FIG. 3 is a block diagram of a novel ATM common memory switch designed to handle STM arid ATM signals, according to one embodiment of the present invention.

The present invention is concerned with the scheduling mechanism. Referring to FIG. 3, one of the preferred embodiments is diagrammatically illustrated. The switch of this embodiment includes input channels 80 at an input port and output channels 82 at an output port between which data in STM or ATM are exchanged by way of a common memory 84. Data from the input channels are passed through a packetizing means 86 which packetizes STM data streams into standard ATM cells. ATM data streams are already in ATM cells and need not be repacketized. As is known in the art, the packetizing means generates a traffic descriptor in a certain embodiment which describes the transport type of the digital data. ATM cells are multiplexed at a multiplexer 88 to a bus 90. For scheduling cells the switch contains an ATM scheduler 92 for ATM service and an STM scheduler (slot reservation controller) 94 for STM service. A selection circuit 96 determines whether a cell from the STM or ATM scheduler will be selected next for outputting to bus 98. A demultiplexer 100 spreads out each cell to output channels 82 at the output port. ATM converted STM cells are converted back to STM data at depacketizing means 102. An ATM cell on the bus 90 has it header stripped at a header reader 104. The header of an ATM originating ATM cell is sent to a router 106 of the ATM scheduler 92. As in the ATM switch shown in FIG. 3, the memory manager 110 produces a next available memory space of common memory 84 in which the ATM cell is going to be stored. To do this, the memory manager maintains a list of free memory spaces for the common memory. When an ATM cell arrives, the memory manager outputs the write address of the next available free memory space to the common memory, control FIFOs 108 and VCI/VPI FIFOs 116. Each FIFO in the control FIFOs 108 is assigned to each output channel. In response to the header, the router 106 selects one control FIFO which is assigned to the destination channel and stores the write address at its tail of the queue. The MUX 112 is synchronized with DEMUX 100 and thus when the DEMUX 100 is connected to an output channel, MUX sends to the common memory the write address stored in the control FIFO assigned to this output channel. The write address is now the read address of the memory in which the ATM cell destined to the output channel is stored. The bus 98 reads the ATM cell and the DEMUX 100 sends it to the output channel through the depacketizer 102. The memory manager is synchronized with the DEMUX 100, thus always indicating the output channel which is connected to the common memory at that instance. Although the memory manager 110 can be called location counter, the term used in the STM switch shown in FIG. 1, it does not count linearly or sequentially, that is to say, any memory location can be accessed randomly. A multiplexer 112 sends a read address to a selection multiplexer 114.

The header of an STM originating ATM cell is sent to VCI/VPI FIFOs 116 of the STM scheduler 94 and is stored at one of the FIFOs which is assigned to an output channel. A connection processor 118 programs a reservation table 120 to indicate which time slot is reserved to which VCI/VPI of the input channel. The reservation table will be further described later. The VCI/VPI FIFOs 116 output the read address to the selection multiplexer 114 and also send to an AND gate 122 an indication (a data bit) of the existence of a cell in a FIFO assigned to the VCI/VPI of the output channel. A slot reservation status storage 124 of the table 120 sends a signal to the AND gate 122 to indicate that the VCI/VPI of the input channel is reserved. The slot reservation table 120 specifies all the slots reserved for certain input channels. The AND gate 122 receives a reservation and a data bit and sends its output to selection multiplexer 114. The output of selection multiplexer 114 is a read address for the common memory so that a cell stored at the address is read out and transmitted to demultiplexer 100. The output of the selection multiplexer 114 is also applied to memory manager 110 so that the cell location is cleared when the cell is read out. A wrap around slot counter 126 is used to index the slot reservation table.

Figure 4:
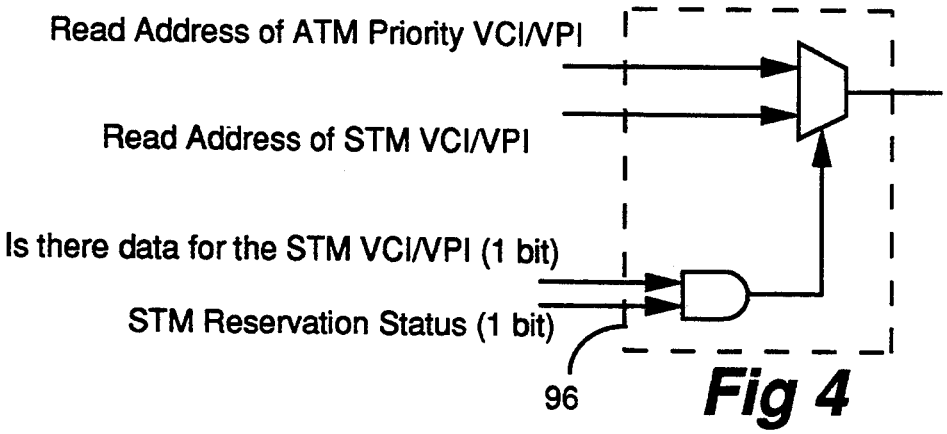
FIG. 4 shows separately a block diagram of the selection circuit which is included in FIG. 3.

FIG. 4 illustrates separately the selection circuit shown in FIG. 3. As seen in the figure, priority is given to STM traffic over ATM traffic. This is required to eliminate CDV. The service mechanism can be viewed as a slotted system where each slot consists of a single ATM cell cycle. If a slot is reserved for STM service, then STM Reservation Status =1. Therefore, if the slot is reserved and the associated STM VCI/VPI has at least one cell waiting for service, the multiplexer selects STM traffic and therefore the STM VCI/VPI will be serviced. If the slot is not reserved or the STM VCI/VPI has no cells, then the ATM priority VCI/VPI will be serviced. Note that with this selection mechanism, unused STM slots will be utilized by the ATM service.

Figure 5:
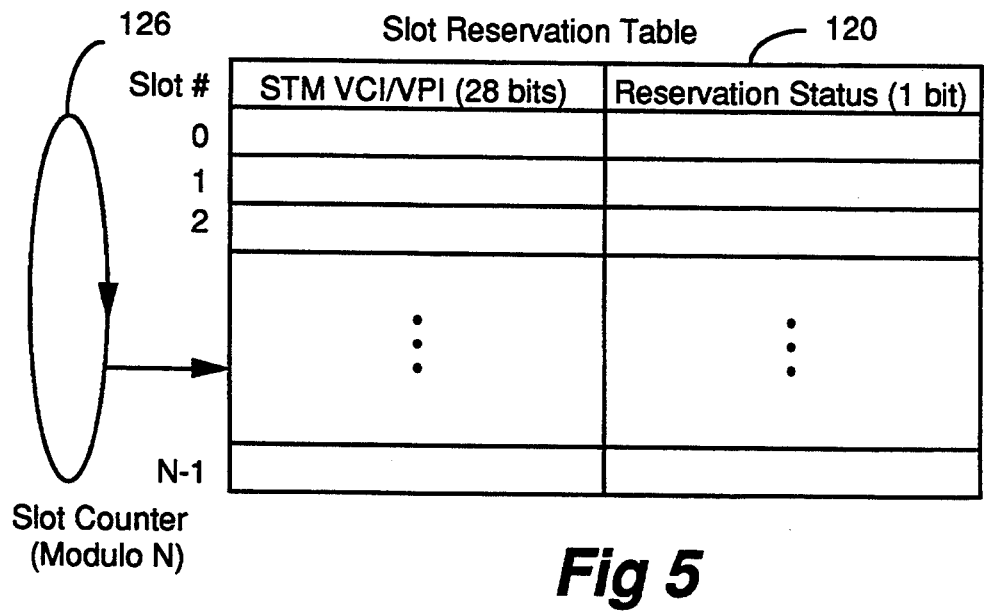
FIG. 5 shows one implementation which can be used for the STM scheduler shown in FIG. 3.

Referring to FIG. 5, the STM scheduler includes a slot reservation table 200 and a slot counter 202. The slot reservation table consists of N rows and two columns. The two columns represent the STM VCI/VPI and the STM Reservation Status. If the slot is reserved, then the reservation status (e.g. 1 bit) is 1; otherwise the reservation status is 0. The STM VCI/VPI field (in this embodiment it is 28 bits long) identifies which VCI or VPI has the slot reserved. The slot reservation table is loaded at connection set-up time by a connection processor shown in FIG. 3, when the slots are assigned. At connection take-down time, the reservation status of the slot(s) associated with the torn-down connection is set to 0. Therefore, the Slot Reservation Table is updated only at connection set-up and take-down times. As mentioned previously, the Slot Reservation Table consists of N rows. The Slot Counter is a modulo N counter. The Slot Counter is incremented every slot (1 ATM cell cycle). The slot counter is used to index the appropriate slot (row) in the Slot Reservation Table. The value for N is based on the resolution of bandwidths supported by the system. In particular, $$N = \frac{\text{Bandwidth of Transmission Medium}}{\text{Minimum Service Bandwidth}}$$

For example, for an OC-12 transmission medium and T1 service, N is approximately 355, once SONET and ATM overhead is accounted for. Since individual VCs or VPs can reserve slots and thus be serviced in non-FIFO order, these VC/VPs must be queued individually. When the Selection Circuit determines the next VCI/VPI to be serviced, it outputs an address indicating the next cell to be output for this VCI/VPI, which address is used to access the common memory.

Figure 6:
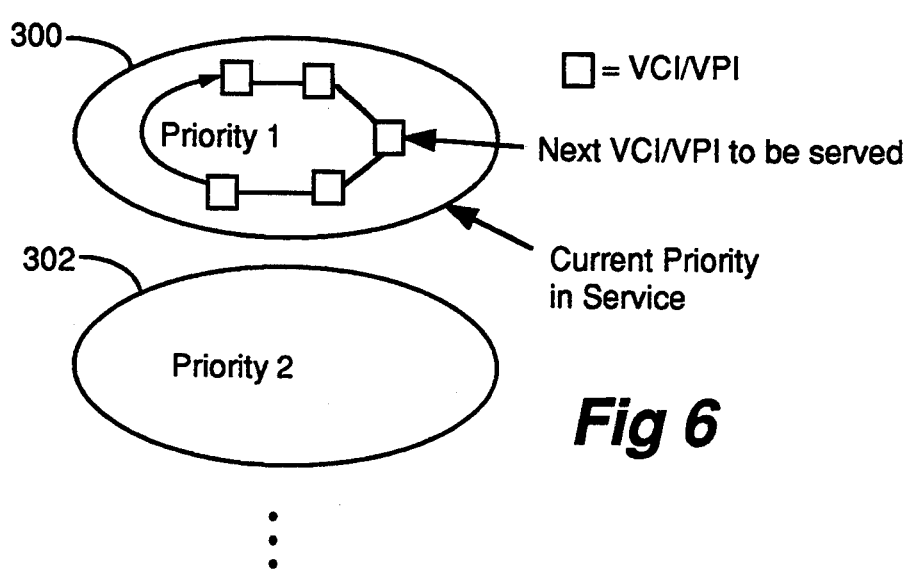
FIG. 6 shows one implementation which can be used for the ATM scheduler shown in FIG. 3.

The priority ATM scheduler can take one of two forms. As described previously, the priority scheduler can consist of FIFO queues, one per priority. The contents of the queues can be ATM cells or pointers to the ATM cells. Alternatively, since separate VC/VP FIFO queuing is provided for STM service, all VC/VPs could be individually queued. FIG. 6 shows such an arrangement. In this case, the ATM priority scheduler comprises circular lists 300, 302 of VCI/VPIs, according to their priority. The highest priority circular list which has entries is served first. After a particular VCI/VPI is served from the circular list, a pointer is forwarded to the next VCI/VPI entry in the list. The entry for the VCI/VPI which was just served remains in the list as long as the VCI/VPI still has ATM cells queued. If there are no more ATM cells queued for the VCI/VPI, then the entry is removed from the circular list. When new cells arrive, the entry will be placed back into the circular list. Therefore, any entry in the circular lists will always represent a VCI/VPI which has at least one ATM cell waiting for service.

Due to the synchronous nature of STM networks, switching equipment is synchronized to the public network clock. In ATM networks, no such synchronization is necessary. Without this synchronization, each ATM switching node will be responsible for its own clock, and some clock drift between switching nodes will occur. With the above STM and ATM scheduling scheme, this clock drift will have an affect on the service. For STM service, the clock drift will induce CDV equal to this clock drift (very small). When assigning STM slots, delay cannot be minimized for STM service due to the clock drift. Of course, these ATM switching nodes could be synchronized to the public network clock. This would eliminate CDV. Also, slots could be assigned to minimize the cell delay (waiting time) in the switch. Synchronization of ATM switching nodes to the public network clock also facilitates the transmission of wireless access services. Most wireless protocols require knowledge of end-to-end delay. Due to the asynchronous and multiplexing behaviour inherent to ATM, exact end-to-end delay is unknown (i.e. some CDV occurs). STM provides exact delays when the switching nodes are synchronized.

As seen in the above disclosure, the present invention provides a service mechanism for ATM networks carrying STM and ATM traffic. In further embodiments, an ATM switching node employing the scheduling mechanism of the present invention can operate in pure ATM mode (i.e. no slots reserved), pure STM mode (no priority ATM service), or concurrent STM and ATM mode (i.e. any individual VC or VP can use either STM or ATM service).

Although the above invention is intended to provide STM and ATM service, several other applications exist. Specifically, the slot reservation mechanism (STM scheduler) can be used to shape traffic to any arbitrary distribution by assigning the appropriate slots through the connection processor. Therefore, cell spacing or shaping to a desired traffic descriptor can be performed. Another application of this invention is for a new service class termed Minimum Guaranteed Bandwidth Service. This new service class uses both STM and ATM scheduling. A block of slots in the STM scheduler can be set aside for this guaranteed bandwidth. With this service, a connection (VC or VP) is guaranteed at least some minimum bandwidth equal to the number of slots reserved for that connection. Traffic in excess of this guaranteed minimum will be serviced if there is free bandwidth and will be serviced in the ATM priority scheduler, whereas the guaranteed bandwidth will be serviced in the STM priority scheduler. The lowest priority should be employed in the ATM priority scheduler for this excess bandwidth. Individual VC/VP queuing is required for connection of this service type in both ATM and STM schedulers. Minimum Guaranteed Bandwidth service may be effective for VBR video or virtual LAN interconnection.

I claim:

1. A telecommunication switch for switching digital data in cells between ports, said data being a mixture of different transport types and each cell being a predetermined number of bytes long and containing at least a VCI in its header, comprising:
   packetizing means connected to the ports for packetizing digital data into cells and depacketizing cells into digital data, and for generating a traffic descriptor indicative of the transport type of the digital data;
   a common memory connected to ports for storing each cell received therefrom;
   a slot reservation controller having a slot reservation table and a linear slot counter to index VCIs of selected cells to selected slot locations of the table in that the slot locations are adjustable so that a certain adjustable amount of bandwidth can be set aside for one transport type for bandwidth reservation of digital data;
   a scheduler to index VCIs of remaining cells;
   a header reader for reading the header of each cell received from the ports to direct the header to either the slot reservation controller or the scheduler; and
   a selection circuit connected to both the slot reservation controller and the scheduler for sending to the common memory an indication of the VCI of a cell to be read out of the common memory.

2. A telecommunication switch for switching digital data according to claim 1 wherein the slot locations of the table are selectable in response to the traffic descriptor.

3. A telecommunication switch for switching digital data according to claim 1 wherein the digital data are a mixture of STM and ATM stream, the ATM stream being composed of a plurality of cells a predetermined number of bytes long and the packetizing means packetizing and depacketizing the digital data of STM stream into and out of a series of cells a predetermined number of bytes long.

4. A telecommunication switch for switching digital data according to claim 3, Wherein the header reader directs the header of the cells obtained from the STM data stream to the slot reservation controller and the header of the cells from the ATM data stream to the scheduler.

5. A telecommunication switch for switching digital data according to claim 4, wherein the selection circuit always selects cells from the slot reservation controller in preference to the scheduler.

6. A telecommunication switch for switching digital data according to claim 5, wherein the scheduler includes a plurality of FIFOs in more than one priority groups.

7. The telecommunication switch for switching digital data in cells between ports, according to claim 3, wherein:
   the slot locations are adjustable so that certain adjustable amounts of bandwidth can be set aside for pulse shaping of the mixture of different transport types of digital data.

8. In a telecommunication switch for switching digital data in cells between ports, said data being a mixture of different transport types and each cell being a predetermined number of bytes long and containing at least a VCI in its header, the method of switching the digital data in cells comprising steps of:
   at each port, packetizing the digital data into cells and depacketizing cells into digital data, and generating a traffic descriptor indicative of the transport type of the digital data;
   storing each cell received from the ports in a common memory connected thereto;
   indexing VCIs of selected cells to selected slot locations of a table contained in a slot reservation controller;
   indexing VCIs of remaining cells to a scheduler;
   a connection processor sending a description parameter to the slot reservation controller so that desired slot locations of a table can be adjustably set aside for adjustable bandwidth reservation for one transport type of digital data;
   reading the header of each cell received from the ports to direct the header to either the slot reservation controller or the scheduler;

selecting from the slot reservation controller or the scheduler an indication of the VCI of a cell to be read out of the common memory;

sending the indication to the common memory as a read address; and outputting each cell out of the common memory to a selected port.

9. In a telecommunication switch for switching digital data in cells between ports, the method of switching the digital data in cells according to claim 8 wherein the connection processor sends a description parameter to the slot reservation controller so that desired slot locations of a table can be adjustably set aside for pulse shaping of the mixture of different transport types of digital data.

* * * * *